(12) United States Patent
Jakubowski et al.

(10) Patent No.: US 12,364,245 B2
(45) Date of Patent: Jul. 22, 2025

(54) CARRIER AND STROLLER FRAME

(71) Applicant: Vermont Juvenile Mfg., Inc., West Rutland, VT (US)

(72) Inventors: Chris Jakubowski, Rutland, VT (US); Todd M. Jakubowski, Rutland, VT (US); Kristen Jakubowski, Rutland, VT (US)

(73) Assignee: Vermont Juvenile Mfg., Inc., West Rutland, VT (US)

( * ) Notice: Subject to any disclaimer, the term of this patent is extended or adjusted under 35 U.S.C. 154(b) by 61 days.

(21) Appl. No.: 18/506,534

(22) Filed: Nov. 10, 2023

(65) Prior Publication Data

US 2025/0151692 A1 May 15, 2025

(51) Int. Cl.
| | | |
|---|---|---|
| *A01K 1/02* | (2006.01) | |
| *B62B 7/06* | (2006.01) | |
| *B62B 9/14* | (2006.01) | |
| *B62B 9/26* | (2006.01) | |

(52) U.S. Cl.
CPC ............ *A01K 1/0254* (2013.01); *B62B 7/062* (2013.01); *B62B 9/142* (2013.01); *B62B 9/26* (2013.01)

(58) Field of Classification Search
CPC .. A01K 1/0254; A01K 1/0245; A01K 1/0236; B62B 7/04; B62B 7/06; B62B 7/062; B62B 7/064; B62B 7/14; B62B 7/142; B62B 7/145; B62B 9/142; B62B 9/26; B62B 9/28
USPC ........................................................ 119/497
See application file for complete search history.

(56) References Cited

U.S. PATENT DOCUMENTS

| | | | |
|---|---|---|---|
| 7,766,367 B2 * | 8/2010 | Dotsey ...................... | B62B 9/26 280/658 |
| 12,022,798 B2 * | 7/2024 | Yang ..................... | A01K 1/0254 |
| 2018/0022371 A1 * | 1/2018 | Jakubowski .......... | B62B 5/0013 280/641 |
| 2018/0132446 A1 * | 5/2018 | Jakubowski ............ | B62B 7/105 |
| 2020/0296919 A1 * | 9/2020 | Jakubowski ......... | A01K 1/0254 |
| 2021/0022314 A1 * | 1/2021 | Xiang ...................... | B62B 9/26 |

FOREIGN PATENT DOCUMENTS

DE 29910609 U1 * 9/1999 ............... B62B 7/10

OTHER PUBLICATIONS

DE-29910609-U1_MACHINE_TRANSLATION (Year: 1999).*

* cited by examiner

*Primary Examiner* — Morgan T Jordan
*Assistant Examiner* — Sahar Almatrahi
(74) *Attorney, Agent, or Firm* — Volpe Koenig

(57) ABSTRACT

An assembly comprising a stroller with a removably attached carrier. The carrier has front and rear access to the enclosed space and is useable separately from the stroller.

19 Claims, 13 Drawing Sheets

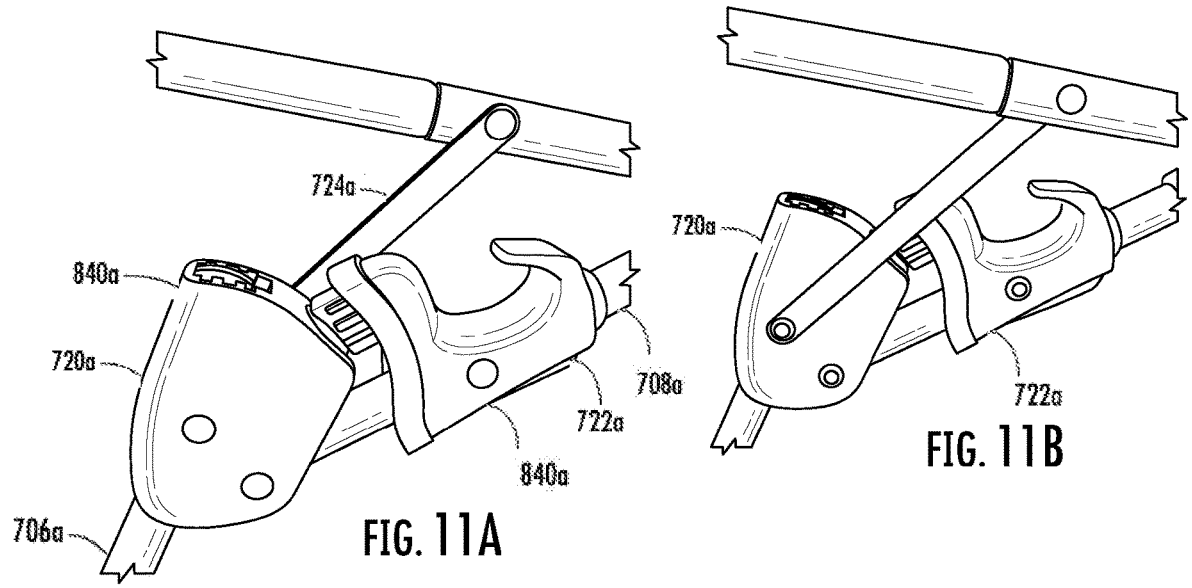
FIG. 11A
FIG. 11B
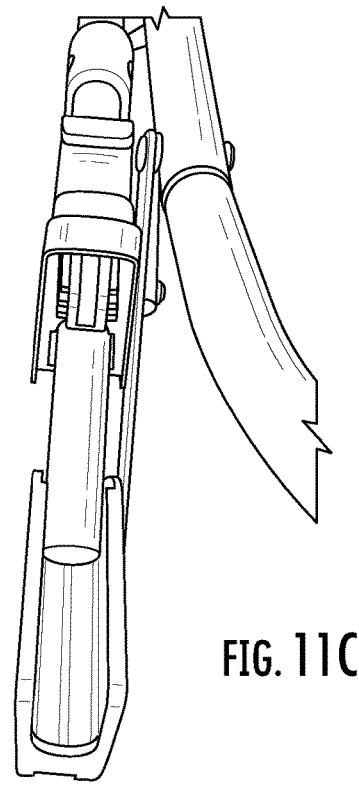
FIG. 11C

CARRIER AND STROLLER FRAME

FIELD

The disclosure relates to carriers, strollers, and assemblies of carriers with strollers.

BACKGROUND

Many people enjoy taking their pets with them to a variety of locations. Often the pet may be carried. In such a case, a carrier may be useful. Devices to carry pets and transport pets within carriers are desired.

SUMMARY

In an aspect, the invention relates to a stroller. The stroller comprises a first side, a second side, an upper frame, a first side leg on the first side, a second side leg on the second side, a first side wheel operable connected to the first side leg at a first end of the first side leg, a second side wheel operably connected to the second side leg at a first end of the second side leg, a front frame, a front wheel support, at least one front wheel operably and rotatably connected to the front wheel support, and a carrier receiver. The upper frame comprises a first side member pivotally connected to the first side leg at a second end of the first side leg opposite to the first end thereof, and a second side member pivotally connected to the second side leg at a second end of the second side leg opposite to the first end thereof. The upper frame also comprises a push bar connecting a first end of the first side member and a first end of the second side member. The front frame comprises a first side member comprising a first end releasably engaged with the second end of the first member of the upper frame through a first side releasable connection, a second side member comprising a first end releasably engaged with the second end of the second member of the upper frame through a second side releasable connection. The first and second side member of the front frame converge toward each other to a bottom of the front frame and are fixed to one another to form a rigid front frame. The front wheel support is connected to the bottom of the front frame. The carrier receiver is pivotally connected proximal to the first end of the first side member of the front frame, the first end of the second side member of the front frame, the second end of the first side member of the upper frame, and the second end of the second side member of the upper frame.

In an aspect, the invention relates to an assembly comprising a stroller and a carrier. The stroller comprises a first side, a second side, an upper frame, a first side leg on the first side, a second side leg on the second side, a first side wheel operable connected to the first side leg at a first end of the first side leg, a second side wheel operably connected to the second side leg at a first end of the second side leg, a front frame, a front wheel support, at least one front wheel operably rotatably connected to the front wheel support, and a carrier receiver. The upper frame comprises a first side member pivotally connected to the first side leg at a second end of the first side leg opposite to the first end thereof, and a second side member pivotally connected to the second side leg at a second end of the second side leg opposite to the first end thereof. The upper frame also comprises a push bar connecting a first end of the first side member and a first end of the second side member. The front frame comprises a first side member comprising a first end releasably engaged with the second end of the first member of the upper frame through a first side releasable connection, a second side member comprising a first end releasably engaged with the second end of the second member of the upper frame through a second side releasable connection. The first and second side member of the front frame converge toward each other to a bottom of the front frame and are fixed to one another to form a rigid front frame. The front wheel support is connected to the bottom of the front frame. The carrier receiver is pivotally connected proximal to the first end of the first side member of the front frame, the first end of the second side member of the front frame, the second end of the first side member of the upper frame, and the second end of the second side member of the upper frame. The carrier may be received in the carrier receiver.

BRIEF DESCRIPTION OF THE DRAWINGS

The following detailed description of embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIGS. 11A, 11B, and 11C illustrate an embodiment of a releasable connection for a stroller in an open position.

DETAILED DESCRIPTION

Figure 1:
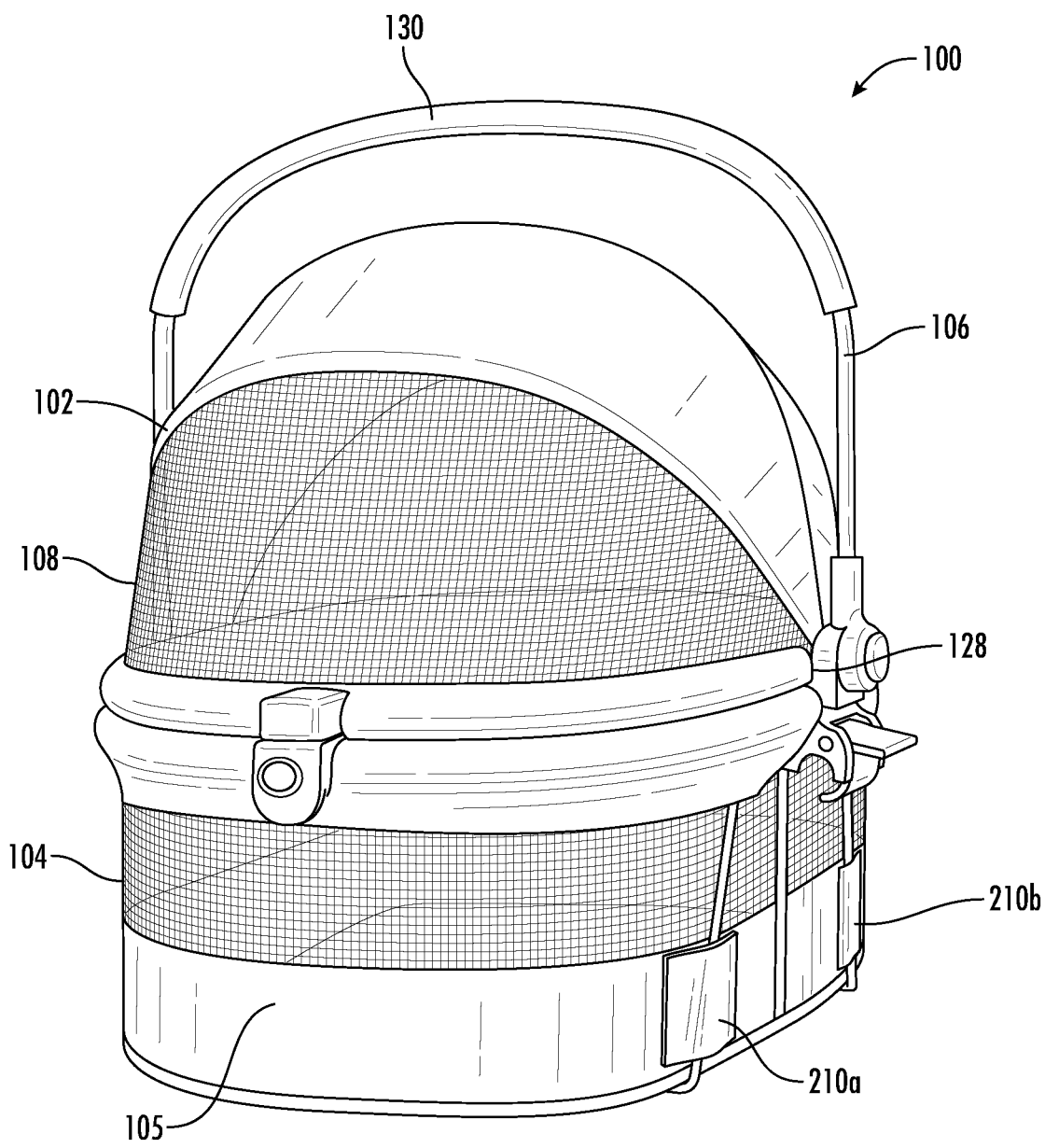
FIG. 1 illustrates a perspective view of an embodiment of a carrier.
Figure 2:
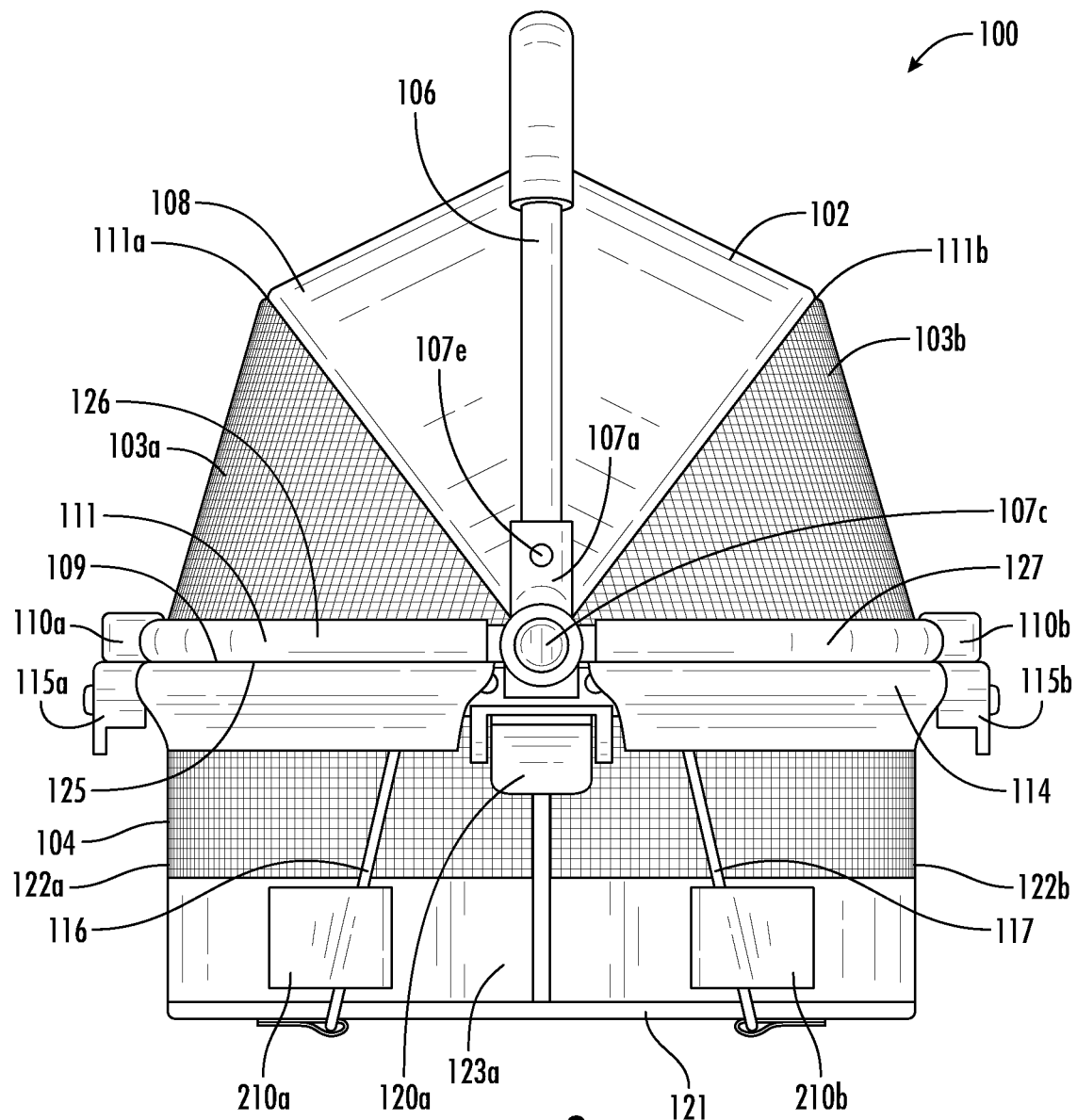
FIG. 2 illustrates a first side view of the carrier shown in FIG. 1.
Figure 3:
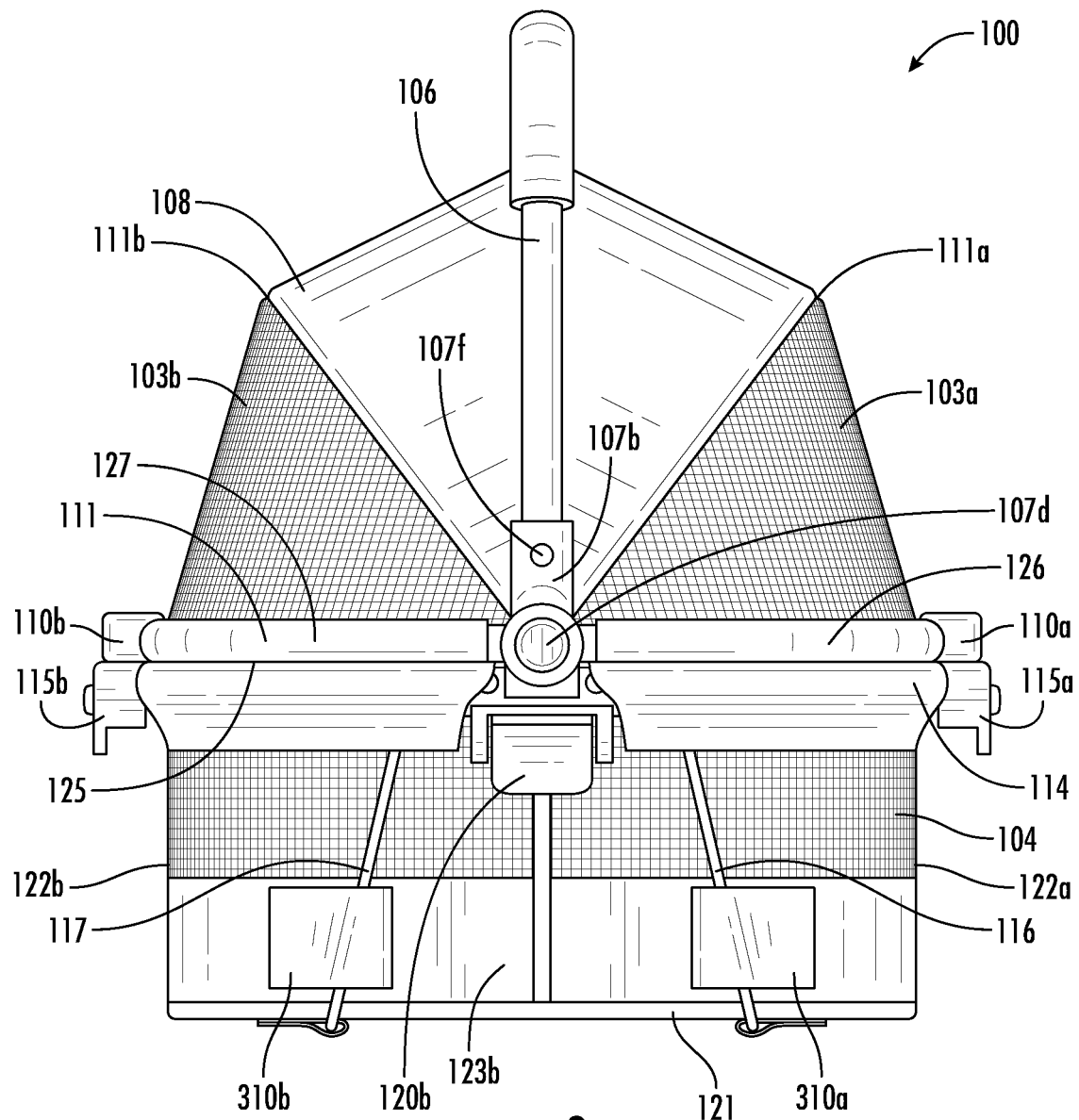
FIG. 3 illustrates a second side view of the carrier shown in FIG. 1.
Figure 4:
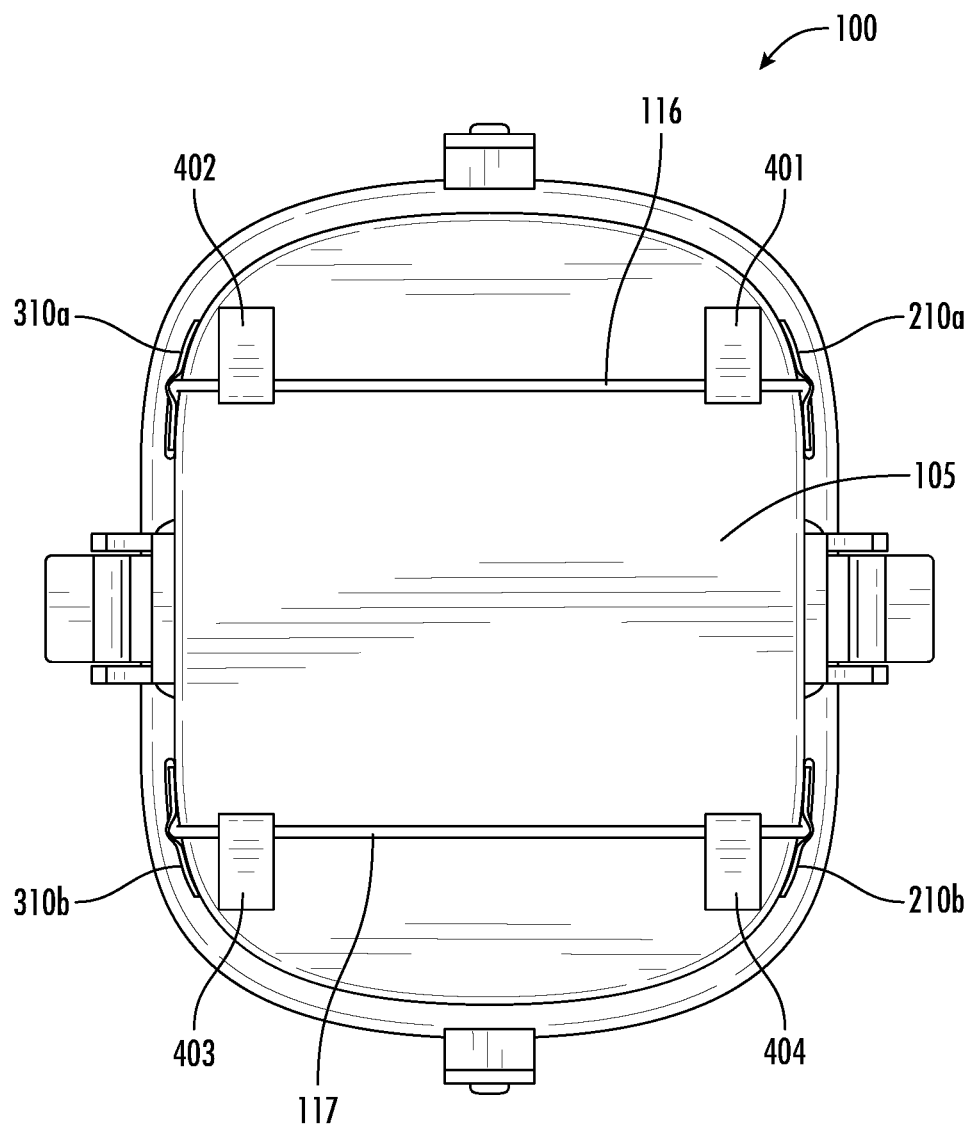
FIG. 4 illustrates a bottom view of the carrier shown in FIG. 1.
Figure 5:
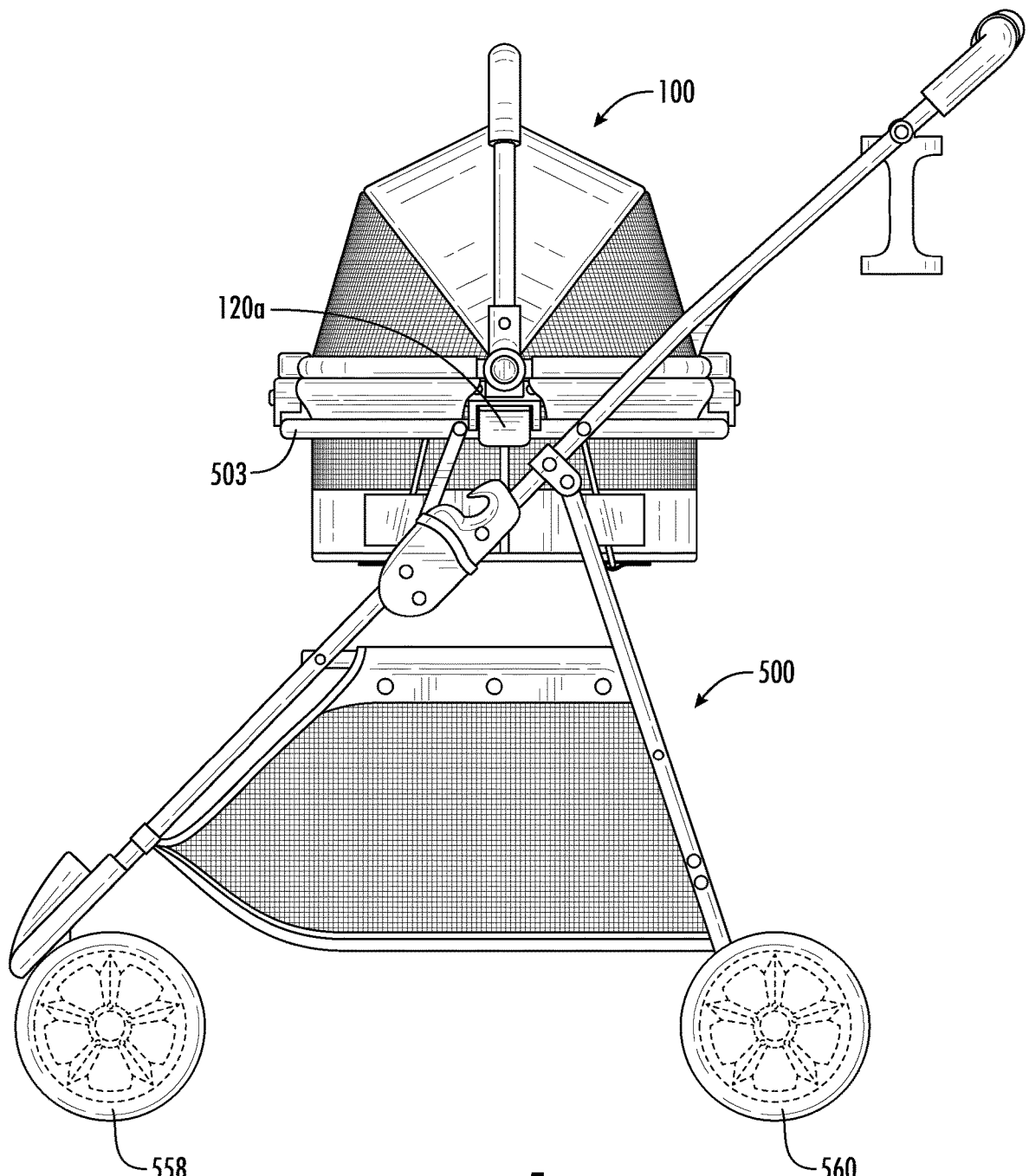
FIG. 5 illustrates an embodiment with the carrier in combination with a stroller frame.

Certain terminology is used in the following description for convenience only and is not limiting. The words "right," "left," "top," and "bottom" designate directions in the drawings to which reference is made.

The words "a" and "one," as used in the claims and in the corresponding portions of the specification, are defined as including one or more of the referenced item unless specifically stated otherwise. The phrase "at least one" followed by a list of two or more items, such as "A, B, or C," means any individual one of A, B or C as well as any combination thereof.

An embodiment includes a carrier. Referring to FIGS. 1-4, an embodiment is illustrated as carrier 100, which may be a pet carrier. The carrier 100 may comprise a top section 102, a bottom section 104 having an upper rim 125, a handle 106, a first carrier engagement 120a, a second carrier engagement 120b, and an interior defined between the top section and the bottom section.

The top section 102 may comprise a front 103a, a back 103b, and a canopy 108. The top section 102 may also comprise at least one canopy frame element supporting the canopy, a front canopy latch element 110a at the front, and a back canopy latch element 110b at the back, as illustrated for top section 102. Ridges 111a and 111b may be present, and may be seams of different panels of the canopy, and/or engagement areas between the canopy at frame elements inside the canopy. Frame elements inside the canopy 108 may be enclosed within or tethered to canopy material. The canopy 108 may also comprise a lower edge 109 configured to be proximal to the upper rim 125 of the bottom section 104. A first canopy frame element 111 of the at least one canopy frame element comprises two frame elements in the form of a front frame element 126 and a back frame element 127, where each may extend partially around the lower edge of the canopy. The front frame element 126 and the back frame element 127 may meet at a first pivot 128 on a first side of the canopy. The front frame element 126 and the back frame element 127 may also meet at a second pivot 129 on a second side of the canopy. The front frame element 126, back frame element 127, first pivot 128, and second pivot 129 are configured such that one or both of the front and back sides of the canopy may be rotated upward from the closed canopy position shown with the front frame element 126 and the back frame element 127 on the rim 125 as well as back in a downward direction. The front canopy latch element 110a may be attached to the front frame element 126, and the back canopy latch element 110b may be fixed to the back frame element 127. The frame elements other than the first frame element 126 and the second frame element 127 may each comprise a first end associated with an attachment point on the first side of the carrier, and a second end associated with an attachment point on the second side of the carrier. The attachment points may be at the first pivot 128 and the second pivot 129 such that one or both of the front and back sides of the canopy may be rotated upward or downward. Intermediate portions, between the first and second ends, of these frame elements may be configured to contact, be contained within the material of, or be tethered to the canopy 108.

The carrier 100 has the bottom section 104, which may comprise a base 121, a front 122a, a back 122b, a first side 123a, a second side 123b, a shell 105, at least one bottom frame element, a front bottom latch element 115a on the front, and a back bottom latch element 115b on the back. A first bottom frame element 114 of the at least one bottom frame element may extend around the top of the bottom section 104 to form the upper rim 125. The front and the back bottom latch elements (115a, 115b) may be fixed to the first bottom frame element 114.

The material of a portion or the whole of at least one of the canopy or the shell may be opaque, translucent, solid, or mesh. Any type of material may be used. The material may be nylon.

The carrier 100 may include a handle, which may be the handle 106 illustrated. The handle 106 may comprise a grip 130. The grip 130 when present may be a separate piece attached to the handle 106. The separate piece may be wrapped around or encircle the handle 106. The grip 130 may be integral with the handle 106. The grip 130 may be a different texture and/or width section of the same material comprising the handle 106. The grip may be leather or artificial leather. The carrier may also comprise a first handle receiver 107a, and a second handle receiver 107b. The first handle receiver 107a may be engaged with at least one of the first canopy frame element 111 or the first bottom frame element 114 on the first side of the carrier. The second handle receiver 107b may be engaged with at least one of the first canopy frame element 111 or the first bottom frame element 115b on the second side of the carrier. Each handle receiver may be connected to at least one of the first canopy frame element 111 or the first bottom frame element 114 or integral thereto. The grip 106 may extend from the first handle receiver 107a to the second handle receiver 107b and over the canopy 108. Each handle receiver may be separate from the handle 106 and connected to it. One or both handle receiver may be integral with the handle 106. The engagement between the handle 106 and one or both of the handle receivers 107a, 107b may be integral. The engagement may include a first end of the handle 106 inserting into an opening in the first handle receiver 107a, and a second end of the handle 106 inserting into an opening in the second handle receiver 107b. The engagement may include at least one of fasteners 107e and 107f. Examples of a fastener that could be one of fasteners 107e or 107f include a screw, bolt, a pin, a snap-in connector, an interference fit. One or both of fasteners 107e or 107f could be molded on, over molded plastic on metal handle tube, or an adhesive.

In an embodiment, the handle 106 is fixed in position. In an embodiment, each handle receiver may comprise a handle release (107c, 107d), which when actuated allow rotation of the handle 106 over the top of the carrier 100.

The handle 106 may be comprised of more than one part or be a single piece.

The front canopy latch element 110a may be engageable with the front bottom latch element 115a to secure the front of the top section 102 to the front of the bottom section 104 in a front closed position. The front canopy latch element 110a may also be releasable to an open position, allowing movement of the top section 102 at the front of the carrier to reveal the interior of the carrier.

The back canopy latch element 110b may be engageable with the back bottom latch element 115b to secure the back of the top section 102 to the back of the bottom section 104 in a back closed position. The back canopy latch element 110b may be capable of being released to an open position, allowing movement of the top section 102 at the back of the canopy to reveal the interior of the carrier.

The first carrier engagement 120a is illustrated on the first side of the bottom section 104. The second carrier engagement 120b is illustrated on the second side of the bottom section 104. Both the first carrier engagement 120a and the second carrier engagement 120b may be capable of engaging a secondary device in order to fix the carrier to the secondary device. The secondary device may be a stroller frame. The carrier engagements 120a, 120b may be connected to or integral with the first bottom frame element 114, or other structures on the carrier. In an embodiment, the carrier engagements 120a, 120b are at alternate locations on the carrier. In an embodiment, the carrier engagements 120a, 120b may have alternate structures/mechanisms and/or be moved forward or backward along the carrier.

The top section 102 and the bottom section 104 may form an enclosure, in which a pet may be contained, within the interior of the carrier when the front and the back of the canopy are in the closed position. A pet may also be resident within the bottom section 104 while at least one or both of the front and back portions of the top section 102 are raised.

The pet may then be able to view the surrounding environment, or others may be able to interact with the pet visually or by touch.

The interior bottom of the bottom section may comprise at least one of a rigid support, a semi-rigid support, and a pad. The at least one of a rigid support, a semi-rigid support, and a pad may serve as a floor to the carrier upon which an occupant in the carrier may be situated. Alternatively, the interior shell on the bottom may serve as the structure upon which the occupant may be situated. The occupant may be a pet.

The carrier may further comprise a first support wire 116 proximal to the front of the bottom section 104. The first support wire may be engaged with the first bottom frame element 114 on the first and second sides of the bottom section 104, and is illustrated extending from the first bottom frame element 114 along the first side of the bottom section 104 toward the base 121, across the base 121, and along the second side of the bottom section 104 toward the first bottom frame element 114. The carrier illustrated also further comprises a second support wire 117 proximal to the rear of the bottom section 104, engaged with the first bottom frame element 114 on the first and second sides of the bottom section 104, and is illustrated extending from the first bottom frame element 114 along the first side of the bottom section 104 toward the base 121, across the base 121, and along the second side of the bottom section 104 toward the first bottom frame element 114. The bottom of the carrier may also comprise at least one of bottom wire holders 401, 402, 403, and 404. The support wire 116 may pass through bottom wire holders 401 and 402, and the support wire 117 may pass through bottom wire holders 403 and 404.

The embodiment illustrated shows the support wires exterior to the shell 105. One or both of the first support wire 116 and second support wire 117 may be positioned exterior to the bottom section 104, interior to the bottom section 104, or within the material of the bottom section 104. The support wires 116, 117 may stabilize the structure of the carrier 100. The support wires 116, 117 may be utilized to stabilize the bottom when the carrier 100 is set on a surface. The embodiment illustrated includes flaps 210a, 210b, 310a, and 310b that secure the support wires to the base 121, and may stabilize the positioning of the support wires. At least one of the flaps 210a, 210b, 310a, and 310b may be connected to the carrier at both ends of the flaps. Alternatively, at least one of the flaps 210a, 210b, 310a, and 310b may be attached at one point to the carrier, preferably proximal the end of the respective flap 210a, 210b, 310a, and 310b. At least one of the flaps 210a, 210b, 310a, and 310b may include hook and loop (Velcro®) fastener strips. The hook and loop (Velcro®) fastener strips may be implemented to secure the respective support wire running through the flap within the flap. One strip of a hook and loop fastener may be on the flap and one strip on the carrier such that the flap sandwiches the wire between the flap and the carrier. In such an embodiment, the respective flap could be permanently connected to the carrier at one or more point along the strip, or may be detachable by fully disengaging the hook strip from the loop strip. One end of a flap may be sewn to the shell, while the other end has the hook or loop strip. The shell may then have the other of the hook or loop strip positioned to engage with the hook or loop strip on the flap. The respective support wire could then be positioned between the flap and the shell, and between the sewn end of the flap and the hook or loop strip end of the flap. Alternatively, the sewn end of the aforesaid flap may instead include a second hook or loop strip while the shell has a matching hook or loop strip aligned thereto.

In another alternative, one of the hook and loop strips may be on a first length of the flap while the other of the hook and loop strips is on a second length of the flap such that the flap is folded around the respective support wire and is maintained in position by the association of the hook and loop strips thereon.

Embodiments of carrier herein may include alternate support structures to stabilize the carrier.

An embodiment includes a stroller that may carry a carrier. The carrier may be the carrier 100 described above. The stroller may be a pet stroller. The stroller may include wheels in any configuration and supports on which a carrier may rest. It may also include restraints to secure the carrier to the stroller. Referring to FIGS. 5-10, an embodiment is illustrated as stroller 500, which comprises a frame 501 and four wheels (wheel 558, wheel 560, wheel 562, and wheel 564). The stroller 500 also includes a carrier receiver 503 into which the carrier 100 may be received. Although the stroller and carrier are illustrated in each of FIGS. 5-10, embodiments include the stroller alone or the carrier alone.

A stroller may simply provide a space for a carrier, and optionally supports for a stroller. A user then could choose to secure the carrier to the stroller in any suitable fashion. For example, a carrier could be strapped to elements of the stroller. The stroller embodiment of FIGS. 6-8 comprise the carrier receiver 503.

Figure 6:
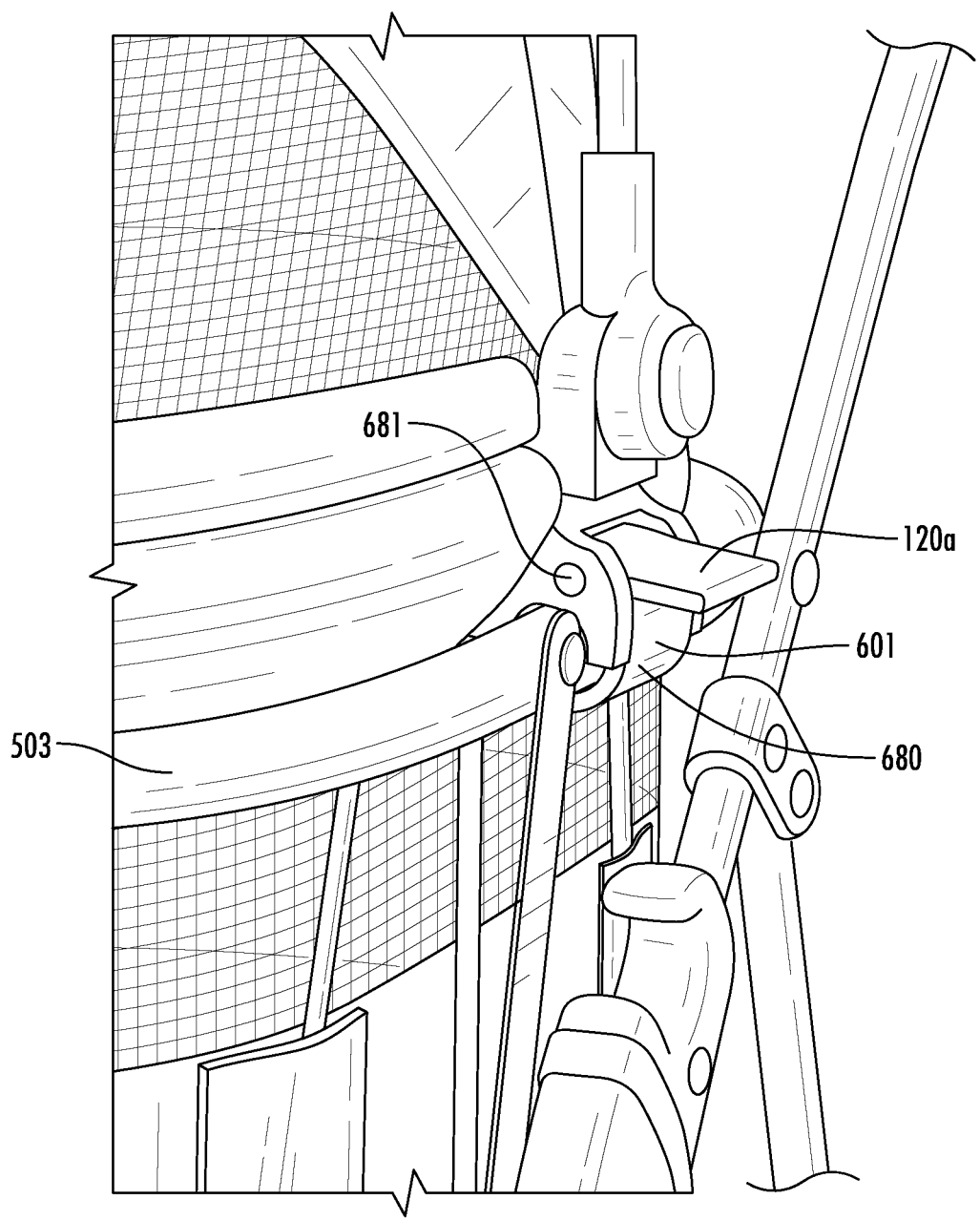
FIG. 6 illustrates the combination of FIG. 5 with one of the carrier engagements in an open position but on the stroller.

An embodiment includes an assembly comprising a carrier and a stroller. The carrier may be received in or secured to the stroller. The carrier may be secured to the stroller by any suitable securements. For example, the carrier could be lashed to elements of the stroller. An embodiment of the assembly comprises the carrier 100 secured to the stroller 500. See FIGS. 5 and 6. As illustrated in FIG. 6, the first carrier engagement 120a engaged with the carrier receiver 503. The second carrier engagement 102b (not shown in FIGS. 5 and 6) may be similarly engaged on the other side of the carrier receiver 503.

The carrier engagements 120a, 120b may have alternate structures/mechanisms and/or be moved forward or backward along the carrier so that the carrier can fit to various secondary devices. The carrier engagements herein are non-limiting examples of carrier engagements or carrier engagement means of embodiments herein. Likewise, the carrier receiver on a stroller may have alternate structures/mechanisms and/or be moved forward or backward along their respective elements to accommodate alternate carrier arrangements and/or engagements. The receivers and carrier supports herein are non-limiting examples of receivers or receiver means and carriers or carrier means of embodiments herein. Carriers and strollers may have alternate accessory structures/mechanisms as well. A carrier may lack carrier engagements such as engagements 120a or 120b, and simply be received within carrier receiver 503.

Referring to FIGS. 5-10, the stroller 500 includes a carrier receiver 503. The carrier receiver 503 may have a frame 750. The frame 750 may have a first side member 752a and a second side member 752b, a front 754, and a back 756. The shape of the frame 750 may be adapted to the carrier to be received. The members, front, and back of the frame 750 may be formed from a single material, may be integral with each other, or be separate members suitably affixed to one another to form the frame. A stroller herein may be configured as known to the skilled artisan to present a wheeled and pushable support system for a carrier.

The stroller may include a first side 702, a second side 704, a front frame 706, and upper frame 708, and two legs 710, 712. The front frame 706 may include a first side member 706a and a second side member 706b. In an embodiment the side member 706a and a second side member 706b are part of a single structure that turns at the bottom 814 such that the first side member 706a and the second side member 706b extend from the bottom and generally toward the upper frame 708. In an embodiment the first side member 706a and the second side member 706b are separate pieces. The two members may be joined by any suitable joint. The first and second side member of the front frame may converge toward each other to the bottom of the front frame and be directly or indirectly fixed to one another to form a rigid front frame. The indirect fixation may be through being separately fixed to an intermediate structure. The front frame may comprise a joint 816 as the intermediate structure. As illustrated, the first side member 706a may be received on the first side 816a of the joint 816, and the second side member 706b may be received on the second side 816b of the joint 816.

The first side member 702a may be fixed to the joint 816 on the first side 816a of the joint, and the member of the second side 702b may be fixed to the joint 816 on the second side 816b of the joint. The joint 816 may include an opening 816c on the first side 816a that receives the first side member 702a. The joint 816 may also include an opening 816d that receives the second side member 816b. The openings 816c and 816d may be shaped and sized to receive the members tightly. Fasteners may anchor the first side member 702a and the second side member 702b onto the joint 816 or within the openings thereon.

In an embodiment where there is a single structure forming both the first and second sides 702a and 702b, the front frame 706 may still comprise the joint 816, with the structure fixed to the bend where the first and second sides converge.

Referring to FIGS. 8 and 11A-11C, the first side member 706a comprises a first end that may be engaged with a second end of the first member 708a of the upper frame through a first side releasable connection 840a. The second side member 706b comprises a first end that may be releasably engaged with a second end of the second member 708b of the upper frame through a second side releasable connection 840b.

Still referring to Referring to FIGS. 8 and 11A-11C, the first side member 706a may be further pivotally connected the first member 708a of the upper frame at a position proximal to first side releasable connection 840a such that when the releasable connection 840a is disengaged the first side member 706a and the first member 708a remain pivotally connected. The second side member 706b may be further pivotally connected the second member 708b of the upper frame at a position proximal to second side releasable connection 840b such that when the releasable connection 840a is disengaged the second side member 706b and the second member 708b remain pivotally connected.

Still referring to Referring to FIGS. 8 and 11A-11C, a first portion of the releasable connection 840a may be fixed to the first side member 706a and may be pivotally connected the first member 708a of the upper frame such that when the releasable connection 840a is disengaged the first side member 706a and the first member 708a remain pivotally connected. A second portion of the releasable connection 840a may be fixed to the first member 708a above the pivotal connection between the first side member 706a and the first member 708a. A first portion of the releasable connection 840b may be fixed to the first side member 706b and may be pivotally connected the first member 708b of the upper frame such that when the releasable connection 840b is disengaged the first side member 706b and the first member 708b remain pivotally connected. A second portion of the releasable connection 840b may be fixed to the first member 708b above the pivotal connection between the first side member 706b and the first member 708b.

Figure 7:
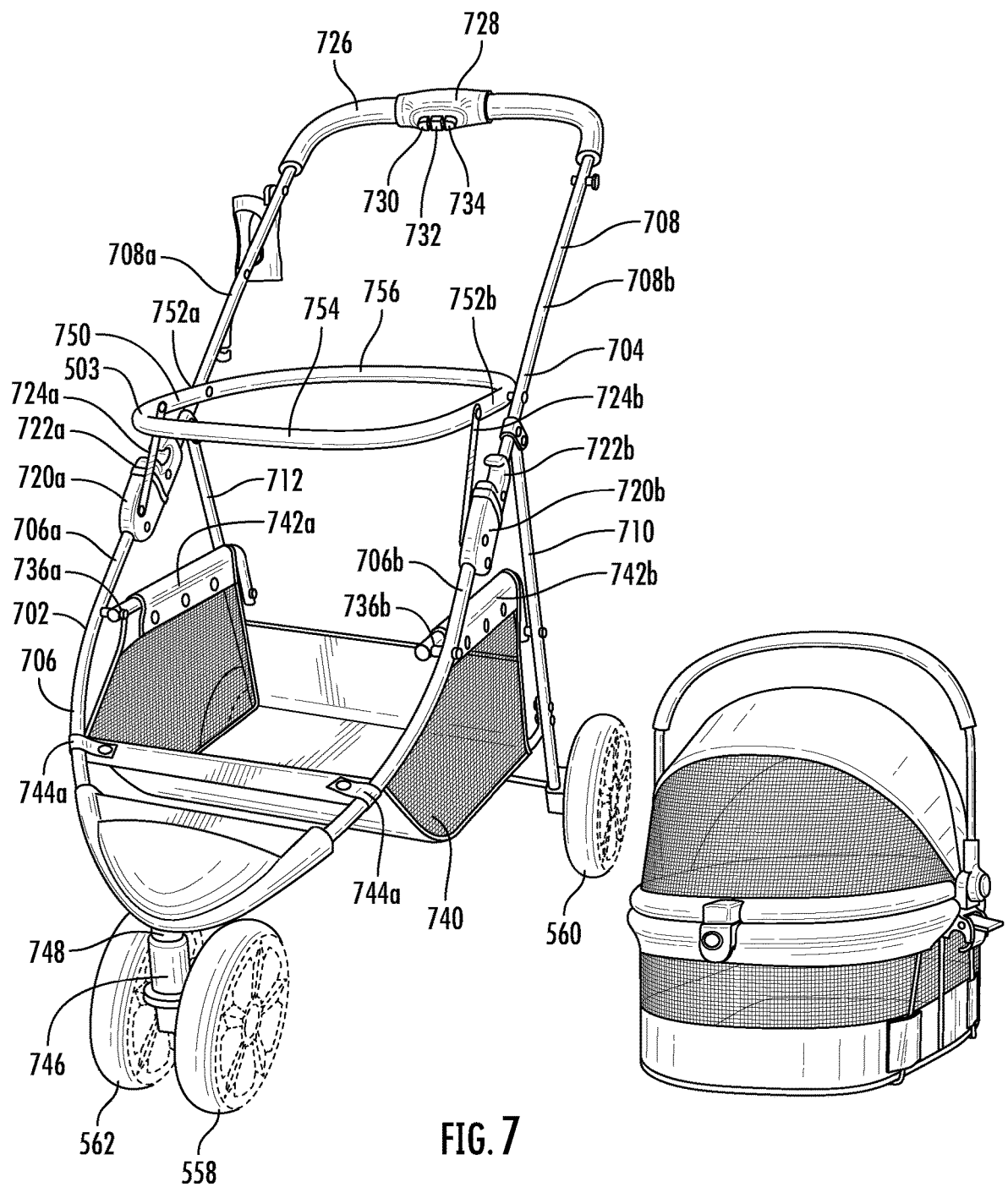
FIG. 7 illustrates a perspective view of the carrier and the stroller of FIG. 5 in an un-combined (non-assembled) state.

As illustrated in FIG. 7, the first side member 706a of the front frame may extend from joint 816 to a locking assembly 720a at the first end of the first side member 706a. The second side member 706b of the front frame may extend from joint 816 to locking assembly 720b at the first end of the second side member 706b. The locking assemblies 720a, 720b may receive the respective side members 706a and 706b. The side member may be fit tightly within openings in the locking assemblies. The side members may be connected to the locking members with one or more fastener.

Likewise, the first side member 708a of the upper frame may extend from the push bar to front pivot block 722a, and the second side member 708b of the upper frame may extend from the push bar to front pivot block 722b.

The locking assemblies 720a and 720b respectively engage with front pivot blocks 722a and 722b to form an embodiment of a releasable connection on the first side and second side, respectively. The locking assemblies and pivot blocks are described in U.S. Pat. Nos. 9,271,474; 9,215,859; 9,485,956, which are incorporated herein by reference as if fully set forth. These front pivot blocks 722a, 722b and locking assemblies 720a, 720b are of the type known in the prior art such as in the Pet Gear Happy Trails™ Pet Stroller (item no. PG8100ST of Pet Gear, Inc., West Rutland, Vt.).

Still referring to FIGS. 5-10, a strut 724a is pivotally connected to locking assembly 720a, and extends to and is pivotally connected to the carrier receiver 503. Likewise, a strut 724b is connected to locking assembly 720b, and extends to and is pivotally connected to the carrier receiver 503. The front wheel mount may rotate about an axis parallel to its length as illustrated in FIG. 7. The mount 746 may comprise an opening to receive peg 748. The peg 748 may be integral with or attached to the front frame 706. As illustrated, the peg 748 may be integral with or attached to the joint 816, which is a component of the illustrated front frame 706.

The stroller may comprise a front wheel mount. The front wheel mount may operably connect at least one wheel to the front frame 706. The front wheel mount may be as illustrated in FIG. 7 as front wheel mount 746. Front wheel mount operably connects front wheels 558, 568 to the front frame 706.

The upper frame 708 comprises a first side member 708a and a second side member 708b, which comprise respective first ends received by and connected to the front pivot blocks 722a and 722b, respectively. The carrier 503 is also pivotally connected to the first side member 708a and the second side member 708b. The combination of the struts 624a, 624b and the side members 708a, 708b support the carrier receiver 503 when the stroller 500 is in an unfolded state. A push bar 726 is connected respective second ends of the first side member 708a and the second side member 708b. The push bar may comprise a grip 728, which may comprise buttons 730, 732, 734. The stroller may comprise actuator buttons 730, 732, 734 even if the stroller does not have a grip. One of the buttons 730, 732, 734 may be a folding actuator operably connected to the front pivot blocks 722a, 722b and locking assemblies 720a, 720b such that pressing the button disengages the pivot blocks from the locking assemblies in order to facilitate folding of the stroller 500. One of the buttons 730, 732, 734 may be a brake actuator operably connect to a brake assembly on one or more of wheels 558,

560, 562, and 564 such that the brake(s) may be set by pressing the brake actuator. One of the buttons 730, 732, 734 may be a brake release and operably connected to the brake assembly (ies) such that pressing the brake release releases the brake(s).

Legs 710 and 712 may be pivotally connected to the first side member 708a and the second side member 708b, respectively. The legs 710, 712 may be pivotally connected to brackets 736a, 736b, respectively. The legs 710, 712 may be connected to one another via a crossbar 838 Further, the brackets 736a, 736b may be pivotally connected to the first side member 706a and the second side member 706b of the front frame 706. The leg 712 may be referred to as a first side leg. The leg 710 may be referred to as a second sed leg. The wheel 564 may be operably connected to the first side leg 712. The wheel 560 may be operably connected to the second side leg 710. The operable connection may be via axle 1004, which may run through mounts 1012 and 1010 connected to the first leg 712 and the first leg 710, respectively. The mounts 1012 and 1010 may permit free rotation of axle 1004. One or both of mounts 1012 and 1010 may include a brake assembly to prevent or stop rotation of the axle 1004. The brake assembly may be operably connected to at least one of a brake assembly actuator and a brake assembly release. The brake assembly actuator may comprise one of buttons 730, 732, 734. The brake assembly release may comprise another of the buttons 730, 732, 734. The operably connection between brake actuator, button, and brake assembly may be a cable. The operably connection between brake release, button, and brake assembly may be a cable.

A basket 740 may be connected to the brackets 736a, 736b, the first and second side members 708a, 708b, and the crossbar 838. The basket 740 may be reversibly connected to the same. The basket may comprise flaps 742a, 742b, 744a, and 744b. The flaps 742a, 742b may be permanently or reversibly wrapped around the brackets 736a, 736b. Likewise, the flaps 744a, 744b may be permanently or reversibly wrapped around the first and second side members 706a, 706b, respectively. The reversible wrap may be established via reversible closures. Exemplary reversible closures include snaps or hood and loop strips.

The back 1046 of the basket 740 may wrap around crossbar 838.

The stroller 500 may comprise a cup holder 946. The cup holder may be connected to one of the first or second side members 708a, 708b of the upper frame 708.

The stroller may comprise a latch 948. The latch 648 may be configured to engage catch 950 when the stroller 500 is in the folded state. The catch 950 may be a bolt, a metal rod, a rod with a widened exterior end. The catch 950 may be any structure upon which the latch 948 may engage.

Figure 9:
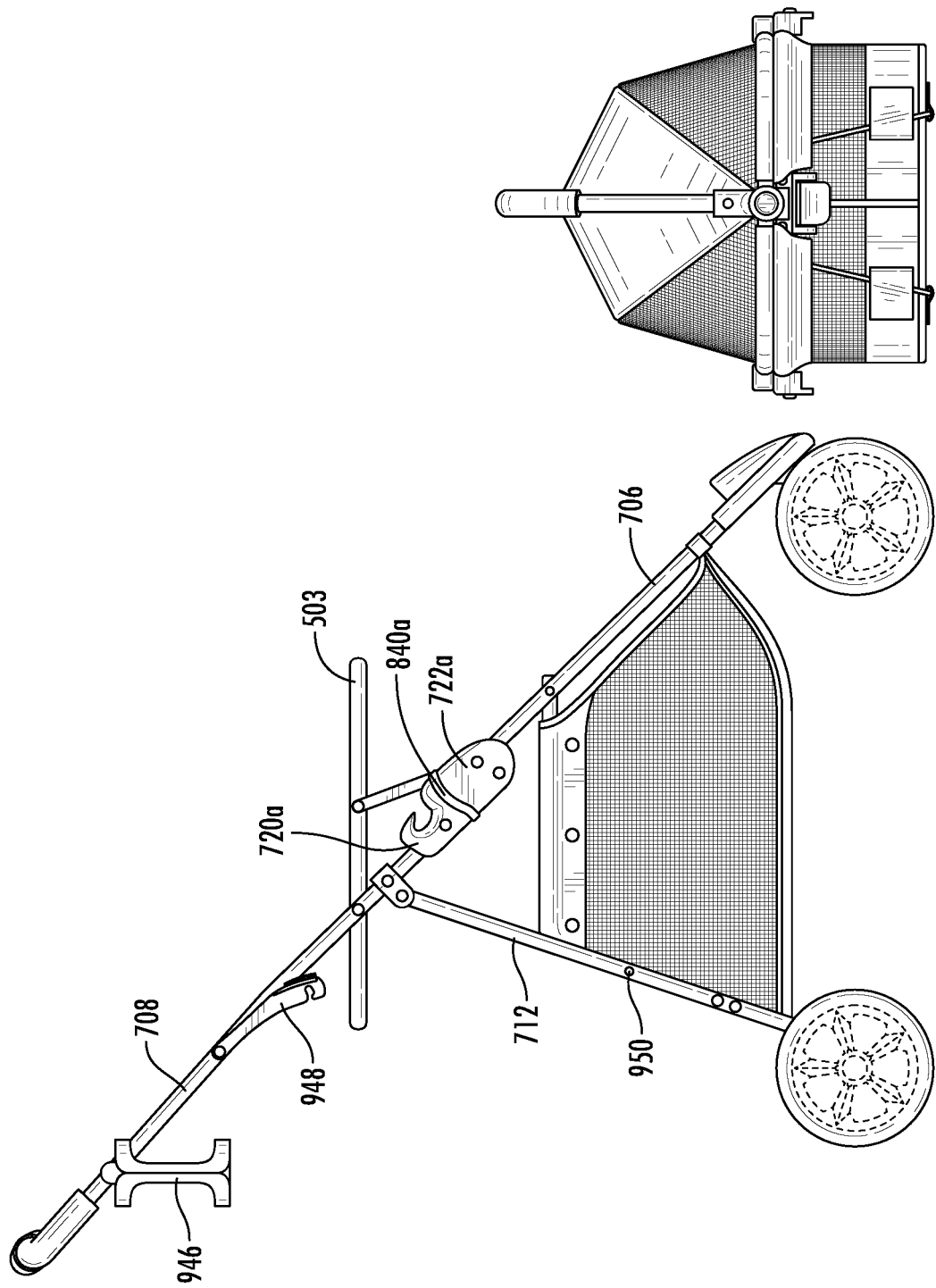
FIG. 9 illustrates a side view of the carrier and the stroller of FIG. 5 in an un-combined (non-assembled) state.
Figure 10:
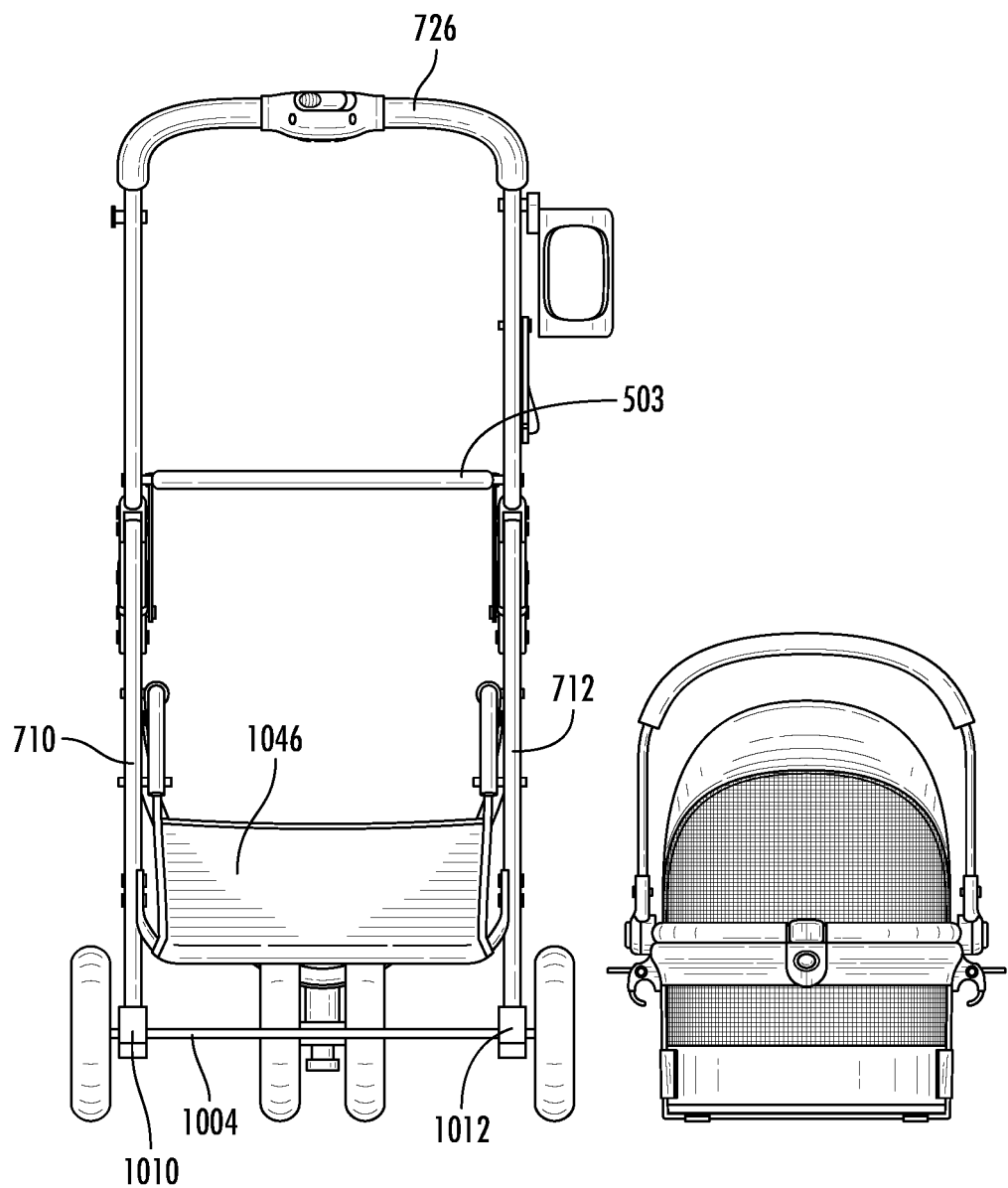
FIG. 10 illustrates a rear view of the carrier and the stroller of FIG. 5 in an un-combined (non-assembled) state.
Figure 12A:
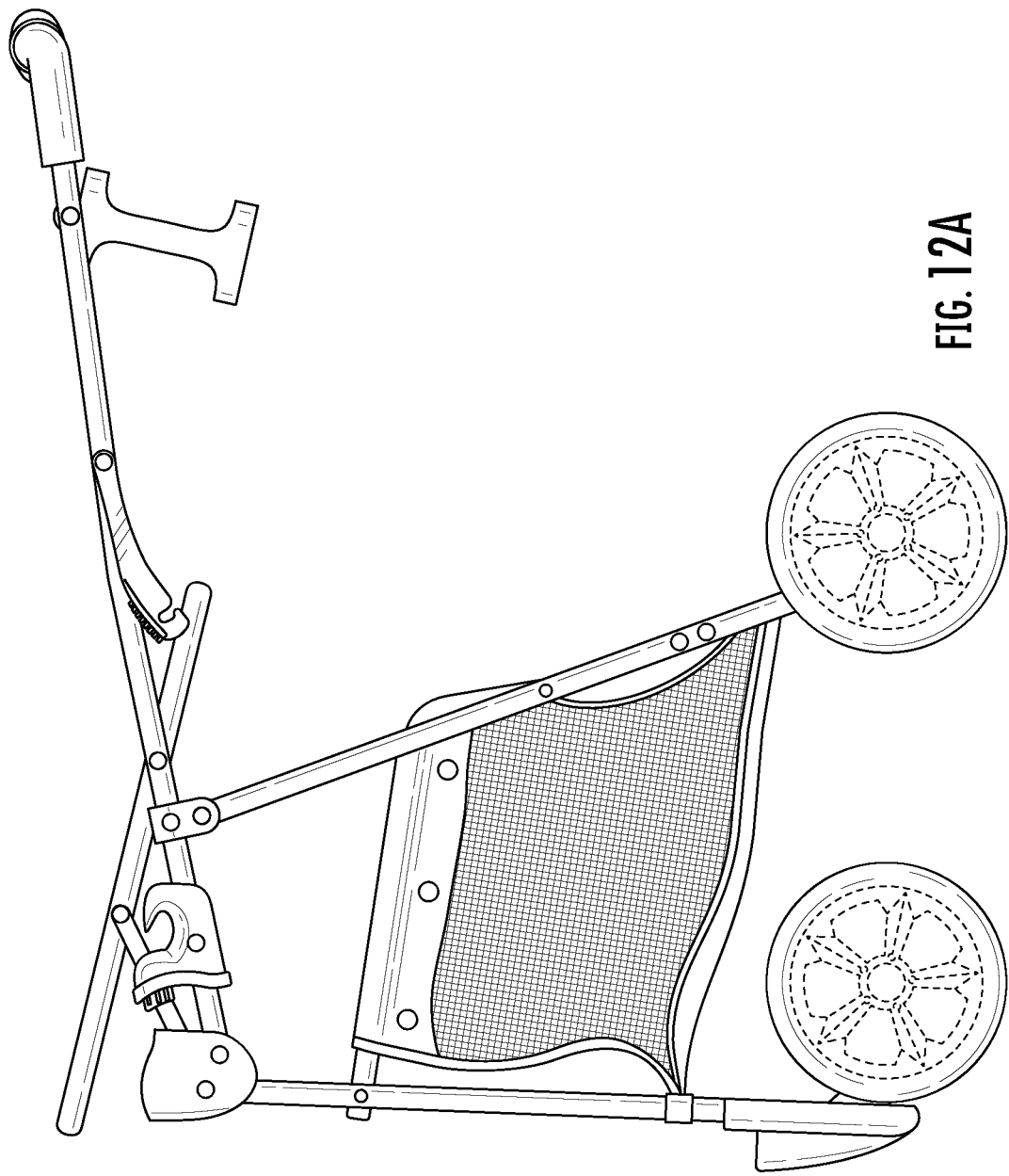
FIGS. 12A and 12B illustrate an embodiment of a stroller in a partially folded and fully folded state, respectively.
Figure 12B:
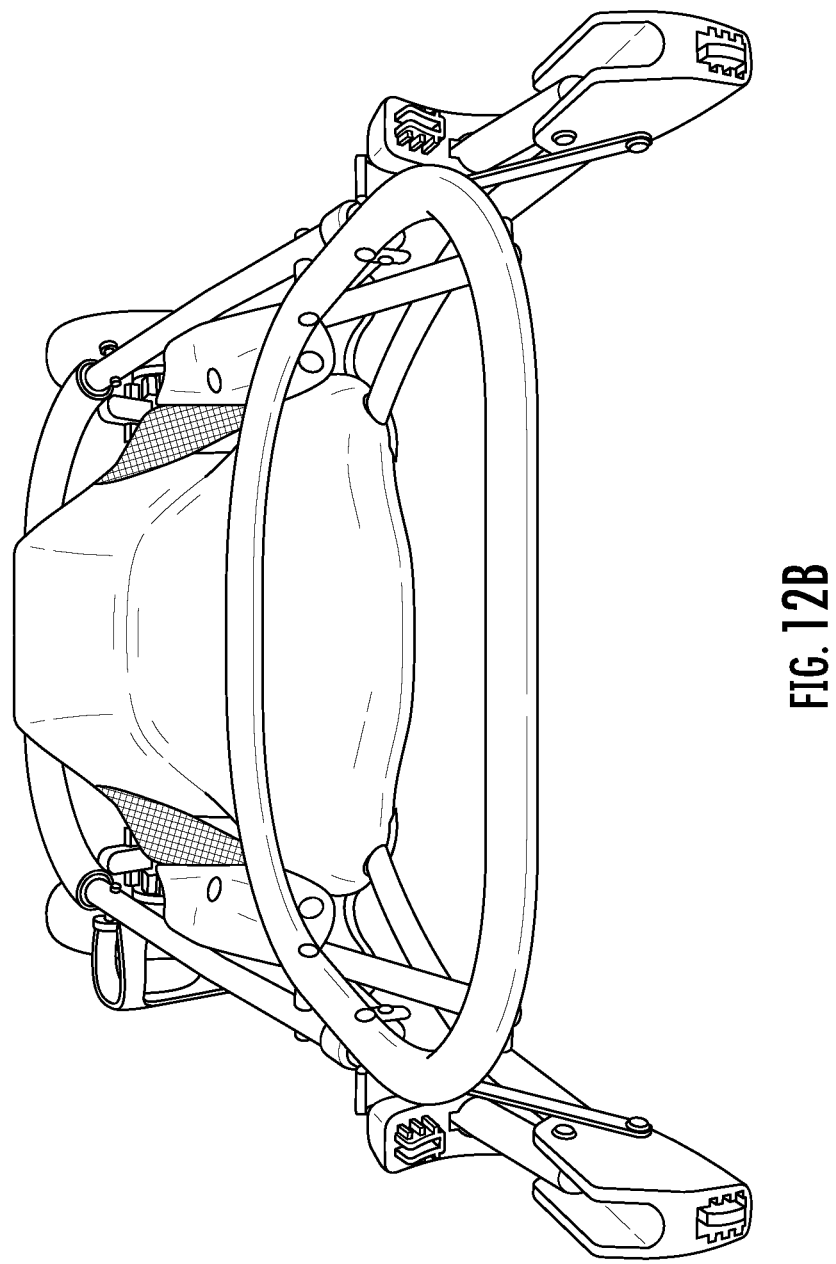

In the unfolded state, the locking assemblies 720a, 720b and front pivot blocks 722a, 722b maintain a rigid structural connection between the first side members 706a, 706b and 708a, 708b, respectively. When the button of buttons 730, 732, 734 that is a folding actuator is pressed, the front pivot blocks 722a, 722b and locking assemblies 720a, 720b disengage. Then, the pivotal connections facilitate folding of the stroller 500 such that the legs 710, 712 collapse under the side members 708a, 708b, with the wheels 560, 564 proximal to the push bar 726. The front frame 706 may also pivot backward and under and between the side members 708a, 708b. The basket 400 may be collapsible and in the folded state be pushed upward by wheels 558, 562. Compare FIG. 9 to FIGS. 12A and 12B. FIG. 9 illustrates the stroller 500 in the unfolded state where the locking assemblies 720a, 720b and front pivot blocks 722a, 722b maintain a rigid structural connection between the first side members 706a, 706b and 708a, 708b, respectively. FIG. 12A illustrates the stroller 500 in an intermediate state between the unfolded and folded states. FIG. 12B illustrates the stroller 500 in the folded state.

Embodiments comprise a stroller having alternate arrangements of static versus pivotal connections compared to those described above. One or more of the pivotal connections may be replaced with a static connection. One or more of the static connections may be replaced with a pivotal connection. In an embodiment, all connections within and between the upper frame and front frame in a stroller are static.

Referring to FIG. 6, the carrier engagement 120a is illustrated engaged, but in an open position, with the carrier receiver 503. The carrier receiver 503 illustrated encircles the carrier 100, and carrier engagement 120b similarly engages the carrier receiver 503.

Figure 8:
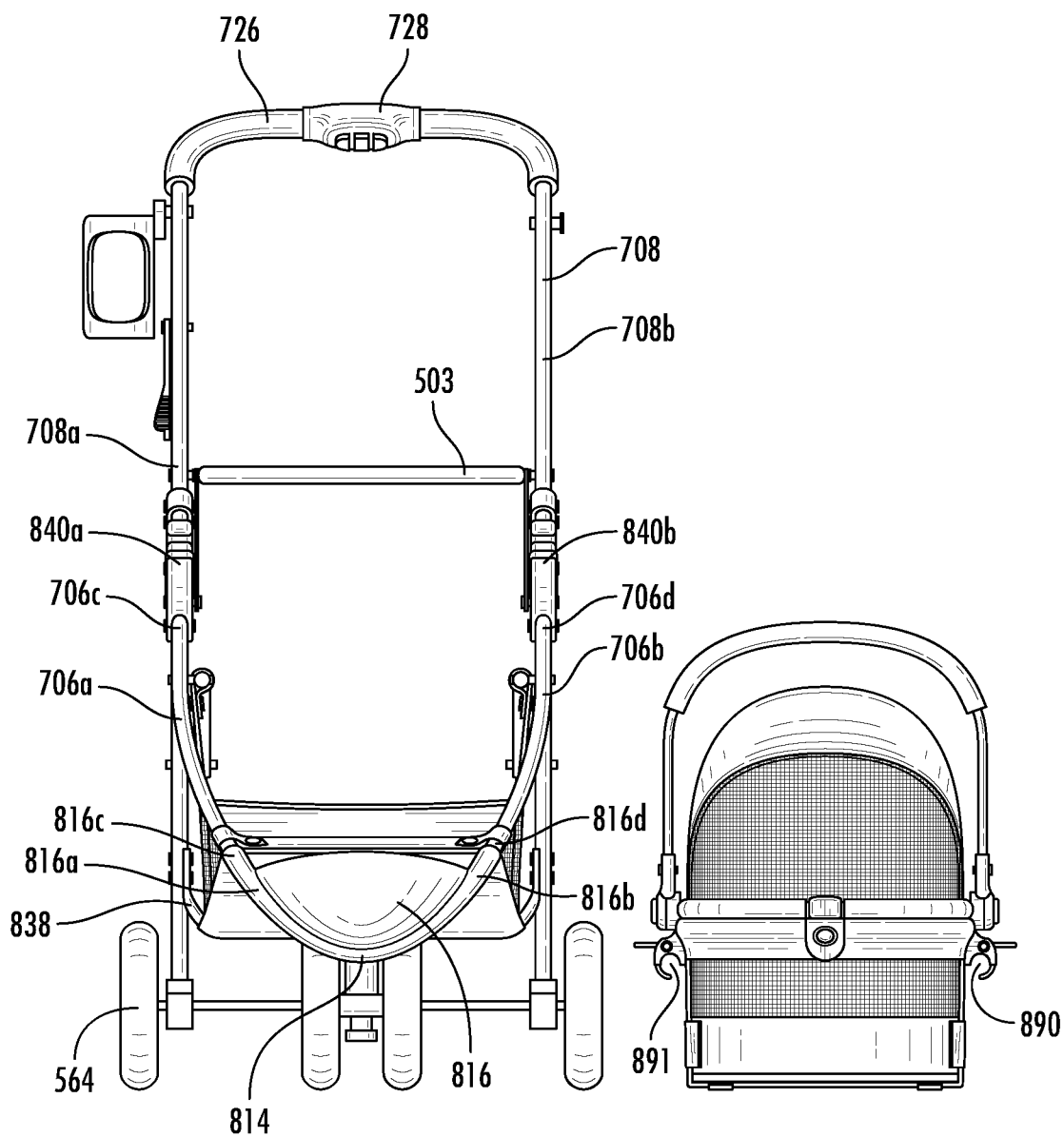
FIG. 8 illustrates a front view of the carrier and the stroller as shown in FIG. 7.

The carrier engagement 120a includes a mount 601, which is fixed to the bottom section 104 of the carrier 100. A mount may, as illustrated for mount 601, be fixed to the first bottom frame element 114. A carrier engagement may also include, as illustrated for pet carrier engagement 120a, a rotating latch 680. The rotating latch may be connected to a mount. In the embodiment illustrated, the rotating latch 680 includes pins received in holes within the mount 601. One pin 681 is illustrated. A similar pin to match is on the far side of the rotating latch 680/mount 601 combination (not shown). The rotating latch 680 includes an opening 890 that may be fitted around a member of the carrier support 503. The open position of rotating latch 680 in FIG. 8 is shown in relation to a stroller. Once the rotating latch is in position over the member 752a of the carrier support 503, it may be rotated to a closed position to engage the member 752a. In FIG. 6, the rotating latch 680 is illustrated in a position where it has been fitted around the carrier support 503. It may be rotated further downward to a closed position. It may lock in the closed position. The lock may be any suitable lock. The lock may be press fitted engagements that may be released by flexing the rotating latch 680 or forcing the engagements past one another. The pet carrier engagement 120b may be configured and operate similar to that of the carrier engagement 120a, where opening 891 is fitted around the carrier support 503 on the other side of carrier 100.

As stated above, an embodiment includes an assembly comprising a carrier and a stroller, where the carrier is received in or secured to the stroller. The carrier may be secured to the stroller by any suitable securements. For example, the carrier could be lashed to elements of the stroller. An embodiment of the assembly comprises the carrier 100 secured to the stroller 500.

The following list of embodiments is a non-exclusive gathering of embodiments herein. Embodiments otherwise described herein are not excluded from the scope of what may be claimed by this list.

LIST OF EMBODIMENTS

1. A stroller comprising:
   a first side, a second side, an upper frame, a first side leg on the first side, a second side leg on the second side, a first side wheel operable connected to the first side leg at a first end of the first side leg, a second side wheel operably connected to the second side leg at a first end of the second side leg, a front frame, a front wheel support, at least one front wheel operably rotatably connected to the front wheel support, and a carrier receiver;

the upper frame comprising a first side member pivotally connected to the first side leg at a second end of the first side leg opposite to the first end thereof, and a second side member pivotally connected to the second side leg at a second end of the second side leg opposite to the first end thereof, and a push bar connecting a first end of the first side member and a first end of the second side member;

the front frame comprising a first side member comprising a first end releasably engaged with the second end of the first member of the upper frame through a first side releasable connection, a second side member comprising a first end releasably engaged with the second end of the second member of the upper frame through a second side releasable connection, wherein the first and second side member of the front frame converge toward each other to a bottom of the front frame and fixed to one another to form a rigid front frame;

the front wheel support connected to the bottom of the front frame; and the carrier receiver pivotally connected to the first end of the first side member of the front frame, the first end of the second side member of the front frame, the second end of the first side member of the upper frame, and the second end of the second side member of the upper frame.

2. The stroller of embodiment 1 further comprising a joint positioned at and forming the bottom of the front frame, wherein the joint comprises a first opening to receive a second end of the first side member, and a second opening to receive a second end of the second side member.

3. The stroller of embodiment 1 or 2 further comprising a first side bracket pivotally connected to the first side member of the front frame and the first side leg, a second side bracket pivotally connected to the second side member of the front member and the second side leg.

4. The stroller of any of the preceding embodiments further comprising first side strut pivotally connected to the carrier receiver and the first end of the first side member of the front frame, and a second side strut pivotally connected to the carrier receiver and the first end of the second side member of the front frame.

5. The stroller of any of the preceding embodiments further comprising a cross bar connected to the first side leg and the second side leg.

6. The stroller of any of the preceding embodiments, wherein the first side releasable connection comprises a locking assembly at the second end of the first side member of the upper frame, and front pivot block at the first end of the first side member of the front frame; and the second side releasable connection comprises a locking assembly at the second end of the second side member of the upper frame, and a front pivot block at the first end of the second side member of the front frame, and wherein each respective locking assembly releasably locks to each respective front pivot block.

7. The stroller of embodiment 6, wherein the stroller is foldable about the respective pivotal connections each respective locking is unlocked and removed from each respective front pivot block.

8. The stroller of any of the preceding embodiments, wherein the carrier receiver comprises a frame configured to receive and circumferentially surround a carrier.

9. The stroller of any of the preceding embodiments, wherein the carrier receiver comprises a first side member on the first side of the stroller, a second side member and the second side of the stroller.

10. The stroller of any of the preceding embodiments further comprising at least one of a folding actuator operably connected to the first side and second side releasable connections, a brake actuator operable connected to at least one of the wheels, and a brake release operably connected to the at least one of the wheels.

11. The stroller of any of the preceding embodiments, wherein at least one of the at least one of a folding actuator, a brake actuator, and a brake release comprises a button disposed on the push bar and pressing the respective button activates the folding actuator, the brake actuator, or the brake release.

12. The stroller of any of the preceding embodiments, wherein the at least one front wheel operably rotatably connected to the front wheel support comprises two wheels.

13. The stroller of any of the preceding embodiments further comprising a basket disposed below the carrier receiver.

14. An assembly comprising the stroller of any of the preceding embodiments and a carrier.

15. The assemble of embodiment 14, wherein the carrier is received in the carrier receiver.

16. The assembly of embodiment 15, wherein the carrier comprises a first carrier engagement connected to a first side of the carrier, and a second carrier engagement connected to a second side of the carrier, and wherein the first carrier engagement is engaged with a first side member of the carrier receiver and the second carrier is engaged with a second side member of the carrier receiver.

17. The assembly of embodiment 16, wherein each carrier engagement respectively comprises a mount fixed to the carrier, and a rotating latch rotatably connected to the mount and comprising an opening adapted to receive a respective one of the first side member or second side member, wherein the rotating latch is configured to rotate to a closed position to close upon the respective one of the first side member or second side member.

18. The assembly of any of embodiments claim 15-17, wherein the carrier comprises a top section, a bottom section having an upper rim, a first pet carrier engagement, a second pet carrier engagement, and an interior defined between the top section and the bottom section;

the top section comprising a front, a back, a canopy, at least one canopy frame element supporting the canopy, the canopy comprising a lower edge configured to be proximal to the upper rim of the bottom section, a first canopy frame element of the at least one canopy frame element extending at least partially around the lower edge of the canopy and having a front section at the front and a pivotal connection to the upper rim;

the bottom section comprising a base, a front, a back, a first side, a second side, a shell, a bottom frame element, the shell extends up from the base to the bottom frame element, the bottom frame element extends around and defines the upper rim of the bottom;

at least one of the top section at the front of the pet carrier or the top section at the back of the pet carrier is openable to reveal the interior of the pet carrier;

the first pet carrier engagement at the first side of the bottom section, the second pet carrier engagement at the second side of the bottom section, both the first pet carrier engagement and the second pet carrier engagement being engageable with the carrier support of the stroller; and the top section, the bottom section, and the base forming an enclosure, in which a pet may be contained, within the interior of the pet carrier when the front and the back of the canopy are in the closed position.

19. The assembly of embodiment 18, wherein each carrier engagement respectively comprises a mount fixed to the respective first or second side of the bottom section, and a rotating latch rotatably connected to the mount and comprising an opening adapted to receive a respective one of the first side member or second side member, wherein the rotating latch is configured to rotate to a closed position to close upon the respective one of the first side member or second side member.

20. The assembly of embodiment 18 or 19, wherein the bottom section further comprises a front canopy latch on the front, the front canopy latch being engageable to secure the front of the top to the front of the bottom in a front closed position, and being releasable to an open position, allowing movement of the top section at the front of the pet carrier to reveal the interior of the pet carrier; and a back canopy latch on the back, the back canopy latch being engageable to secure the back of the top to the back of the bottom in a back closed position, and being releasable to an open position, allowing movement of the top section at the back of the pet carrier to reveal the interior of the pet carrier.

REFERENCE CHARACTER LISTING

100—Carrier
102—Top Section
103a—Front (of top section)
103b—Back (of top section)
104—Bottom Section
105—Shell
106—Handle
107a—First Handle Receiver
107b—Second Handle Receiver
107c—First Handle Release
107d—Second Handle Release
107e—Fastener
107f—Fastener
108—Canopy
109—Lower Edge
110a—Front Canopy Latch Element
110b—Rear Canopy Latch Element
111—First Canopy Frame Element
111a—Ridge
111b—Ridge
114—First Bottom Frame Element
115a—Front Bottom Latch Element
115b—Back Bottom Latch Element
116—First Support Wire
117—Second Support Wire
120a—Carrier engagement
120b—Carrier engagement
121—Base
122a—Front (of the bottom section)
122b—Back (of the bottom section)
123a—First side (of the bottom section)
123b—Second side (of the bottom section)
125—Upper Rim
126—Front Frame Element
127—Back Frame Element
128—First Pivot
129—Second Pivot
130—Grip
210a—Wire Holder
210b—Wire Holder
310a—Wire Holder
310b—Wire Holder
401—Bottom Wire Holder
402—Bottom Wire Holder
403—Bottom Wire Holder
404—Bottom Wire Holder
500—Stroller
503—Carrier Receiver
601—Frame
702—First Side
704—Second Side
706—Front Frame
706a—First Side Member of Front Frame
706b—Second Side Member of Front Frame
708—Upper Frame
708a—First Side Member of Upper Frame
708b—Second Side Member of Upper Frame
710—First Side Leg
712—Second Side Leg
720a—Locking Assembly
720b—Locking Assembly
722a—Front Pivot Block
722b—Front Pivot Block
724a—Strut
724b—Strut
726—Push Bar
728—Grip
730—Button
732—Button
734—Button
736a—Bracket
736b—Bracket
740—Basket
742a—Flap
742b—Flap
744a—Flap
744b—Flap
746—Front Wheel Mount
750—Frame of Carrier Receiver
752a—First Side Member of Carrier Frame
752b—Second Side Member of Carrier Frame
754—Front of Carrier Frame
756—Back of Carrier Frame
814—Bottom
816—Joint
816a—First Side of Joint
816b—Second Side of Joint
816c—Opening on First Side of Joint
816d—Opening on Second Side of Joint
838—Crossbar
946—Cup holder
948—Latch
950—Catch
1004—Axle
1046—Back of Basket It is understood, therefore, that the invention is not limited to the particular embodiments disclosed, but is intended to cover all modifications which are within the spirit and scope of the invention as defined by the appended claims, the above description, and/or shown in the attached drawings.

The invention claimed is:

1. A stroller comprising: a first side, a second side, an upper frame, a first side leg on the first side, a second side leg on the second side, a first side wheel operable connected to the first side leg at a first end of the first side leg, a second side wheel operably connected to the second side leg at a first end of the second side leg, a front frame, a front wheel support, at least one front wheel operably rotatably connected to the front wheel support, and a carrier receiver;

the upper frame comprising a first side member pivotally connected to the first side leg at a second end of the first side leg opposite to the first end thereof, and a second side member pivotally connected to the second side leg at a second end of the second side leg opposite to the first end thereof, and a push bar connecting a first end of the first side member and a first end of the second side member;

the front frame comprising a first side member comprising a first end releasably engaged with the second end of the first member of the upper frame through a first side releasable connection, a second side member comprising a first end releasably engaged with the second end of the second member of the upper frame through a second side releasable connection, wherein the first and second side member of the front frame converge toward each other to a bottom of the front frame and fixed to one another to form a rigid front frame;

a first side strut pivotally connected to the carrier receiver and the first end of the first side member of the front frame, and a second side strut pivotally connected to the carrier receiver and the first end of the second side member of the front frame;

wherein the first and the second side struts each extends upward from a lower portion of a respective locking assembly and provides support to the carrier receiver;

the front wheel support connected to the bottom of the front frame; and the carrier receiver pivotally connected proximal to the first end of the first side member of the front frame, the first end of the second side member of the front frame, the second end of the first side member of the upper frame, and the second end of the second side member of the upper frame.

2. The stroller of claim 1 further comprising a joint positioned at and forming the bottom of the front frame, wherein the joint comprises a first opening to receive a second end of the first side member, and a second opening to receive a second end of the second side member.

3. The stroller of claim 1 further comprising a first side bracket pivotally connected to the first side member of the front frame and the first side leg, a second side bracket pivotally connected to the second side member of the front member and the second side leg.

4. The stroller of claim 1 further comprising a cross bar connected to the first side leg and the second side leg.

5. The stroller of claim 1, wherein the first side releasable connection comprises respective locking assembly at the second end of the first side member of the upper frame, and front pivot block at the first end of the first side member of the front frame; and the second side releasable connection comprises a locking assembly at the second end of the second side member of the upper frame, and a front pivot block at the first end of the second side member of the front frame, and wherein each respective locking assembly releasably locks to each respective front pivot block.

6. The stroller of claim 5, wherein the stroller is foldable about the respective pivotal connections of the front pivot blocks, each respective locking assembly is unlocked and removed from each respective front pivot block.

7. The stroller of claim 1, wherein the carrier receiver comprises a frame configured to receive and circumferentially surround a carrier.

8. The stroller of claim 7, wherein the carrier receiver comprises a first side member on the first side of the stroller, a second side member and the second side of the stroller.

9. The stroller of claim 1 further comprising at least one of a folding actuator operably connected to the first side and second side releasable connections, a brake actuator operable connected to at least one of the wheels, and a brake release operably connected to the at least one of the wheels.

10. The stroller of claim 9, wherein at least one of the folding actuator, the brake actuator, and the brake release comprises a button disposed on the push bar and pressing the respective button activates the folding actuator, the brake actuator, or the brake release.

11. The stroller of claim 1, wherein the at least one front wheel operably rotatably connected to the front wheel support comprises two wheels.

12. The stroller of claim 1 further comprising a basket disposed below the carrier receiver.

13. An assembly comprising the stroller of claim 1 and a carrier.

14. The assembly of claim 13, wherein the carrier is received in the carrier receiver.

15. The assembly of claim 14, wherein the carrier comprises a first carrier engagement connected to a first side of the carrier, and a second carrier engagement connected to a second side of the carrier, and wherein the first carrier engagement is engaged with a first side member of the carrier receiver and the second carrier is engaged with a second side member of the carrier receiver.

16. The assembly of claim 15, wherein each carrier engagement respectively comprises a mount fixed to the carrier, and a rotating latch rotatably connected to the mount and comprising an opening adapted to receive a respective one of the first side member or second side member of the carrier receiver, wherein the rotating latch is configured to rotate to a closed position to engage with a respective one of the first side member or second side member of the carrier receiver.

17. The assembly of claim 14, wherein the carrier comprises a top section, a bottom section having an upper rim, a first pet carrier engagement, a second pet carrier engagement, and an interior defined between the top section and the bottom section;

the top section comprising a front, a back, a canopy, at least one canopy frame element supporting the canopy, the canopy comprising a lower edge configured to be proximal to the upper rim of the bottom section, a first canopy frame element of the at least one canopy frame element extending at least partially around the lower edge of the canopy and having a front section at the front and a pivotal connection to the upper rim;

the bottom section comprising a base, a front, a back, a first side, a second side, a shell, a bottom frame element, the shell extends up from the base to the bottom frame element, the bottom frame element extends around and defines the upper rim of the bottom;

at least one of the top section at the front of the pet carrier or the top section at the back of the pet carrier is openable to reveal the interior of the pet carrier;

the first pet carrier engagement at the first side of the bottom section, the second pet carrier engagement at the second side of the bottom section, both the first pet carrier engagement and the second pet carrier engagement being engageable with the carrier support of the stroller; and the top section, the bottom section, and the base forming an enclosure, in which a pet may be contained, within the interior of the pet carrier when the front and the back of the canopy are in the closed position.

18. The assembly of claim 17, wherein each carrier engagement respectively comprises a mount fixed to the respective first or second side of the bottom section, and a rotating latch rotatably connected to the mount and comprising an opening adapted to receive a respective one of the first side member or second side member of the carrier receiver, wherein the rotating latch is configured to rotate to a closed position to close upon the respective one of the first side member or second side member of the carrier receiver.

19. The assembly of claim 17, wherein the bottom section further comprises a front canopy latch on the front, the front canopy latch being engageable to secure the front of the top to the front of the bottom in a front closed position, and being releasable to an open position, allowing movement of the top section at the front of the pet carrier to reveal the interior of the pet carrier; and a back canopy latch on the back, the back canopy latch being engageable to secure the back of the top to the back of the bottom in a back closed position, and being releasable to an open position, allowing movement of the top section at the back of the pet carrier to reveal the interior of the pet carrier.

* * * * *